United States Patent
Aten

(10) Patent No.: US 9,657,686 B2
(45) Date of Patent: May 23, 2017

(54) SYSTEM, APPARATUS, AND METHOD FOR A VIRTUAL BLOCKER

(71) Applicant: ROHR, INC., Chula Vista, CA (US)

(72) Inventor: Michael Aten, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 850 days.

(21) Appl. No.: 13/888,193

(22) Filed: May 6, 2013

(65) Prior Publication Data

US 2014/0345252 A1 Nov. 27, 2014

(51) Int. Cl.
   *F02K 1/32* (2006.01)
   *F02K 1/72* (2006.01)
   *F02K 1/64* (2006.01)
   *F02K 1/28* (2006.01)

(52) U.S. Cl.
   CPC ............... *F02K 1/72* (2013.01); *F02K 1/28* (2013.01); *F02K 1/32* (2013.01); *F02K 1/64* (2013.01)

(58) Field of Classification Search
   CPC ............... F02K 1/28; F02K 1/32; F02K 1/64
   See application file for complete search history.

(56) References Cited

U.S. PATENT DOCUMENTS

| | | | | |
|---|---|---|---|---|
| 3,618,323 A * | 11/1971 | Needham | ............... | F02K 1/74 60/226.1 |
| 4,073,440 A * | 2/1978 | Hapke | ............... | F02K 1/74 239/265.29 |
| 5,713,537 A * | 2/1998 | Tindell | ............... | F02K 1/32 239/265.17 |
| 5,904,320 A * | 5/1999 | Tindell | ............... | F02K 1/32 239/265.17 |
| 6,679,048 B1 * | 1/2004 | Lee | ............... | F02K 1/002 239/265.23 |
| 2007/0130912 A1 * | 6/2007 | Kraft | ............... | F02C 6/08 60/226.1 |
| 2007/0261410 A1 * | 11/2007 | Frank | ............... | F01D 17/105 60/785 |
| 2008/0250770 A1 * | 10/2008 | Emprin | ............... | F02K 1/566 60/226.2 |
| 2009/0199536 A1 * | 8/2009 | Bulin | ............... | F02K 1/09 60/226.2 |
| 2010/0037587 A1 * | 2/2010 | Vauchel | ............... | F02K 1/386 60/226.2 |

FOREIGN PATENT DOCUMENTS

| | | | | |
|---|---|---|---|---|
| GB | 000925010 A * | 5/1963 | ............... | F02K 1/32 |
| WO | WO9602746 A1 * | 2/1996 | ............... | F02K 1/32 |

* cited by examiner

*Primary Examiner* — Gerald L Sung
*Assistant Examiner* — Scott Walthour
(74) *Attorney, Agent, or Firm* — Snell & Wilmer L.L.P.

(57) ABSTRACT

A virtual blocker door for use in an aircraft thrust reverser is provided. The virtual blocker door may be capable of creating a wall of air to inhibit fan air flow through a fan air duct. The wall of air may direct the fan air flow through a cascade to provide a reverse thrust. Moreover, the virtual blocker door provides for improved aerodynamic efficiency in the fan air duct by replacing traditional brackets, drag links, and doors with a wall of air.

14 Claims, 6 Drawing Sheets

SYSTEM, APPARATUS, AND METHOD FOR A VIRTUAL BLOCKER

FIELD

The present disclosure relates to thrust reverser air management, and more particularly, to a virtual blocker door capable of inhibiting and/or directing air flow in a fan air duct.

BACKGROUND

Typical aircraft thrust reverser systems include blocker doors that inhibit and direct air flow in the fan air duct when the reverser is deployed. These blocker doors are assemblies in the fan air duct that include hinges, a drag link, a drag link attachment fitting, and a door panel. The drag link is connected to or fixed to the inner surface of the fan air duct with the draw link attachment fitting. The second end of the drag link is connected to the door. The door is rotatably connected to a translating sleeve of the aircraft nacelle. At landing, the translating sleeve is moved toward the aft of the aircraft. The movement causes the draw link to rotate the door into the fan air duct. The door inhibits at least a portion of the airflow through the fan air duct to flow into a series of shaped vanes in a cascade array that directs the air outward and forward to create a reverse thrust (e.g., activate the thrust reverser).

The typical structures associated with the thrust reverser that are present in the fan air duct (namely, the bracket and drag link) introduce aerodynamic inefficiencies in the fan air duct, which reduces the overall efficiency of the aircraft engine. More specifically, the structures reduce the efficiency of the system (e.g., the fan air duct) that is primarily responsible for creating thrust for the aircraft.

SUMMARY

The present disclosure improves the aerodynamic efficiency of the fan air duct by, for example, eliminating and/or reducing the structural elements of the thrust reverser system that are installed in the fan air duct. In this regard, the present disclosure generally relates to virtual blocker doors for thrust reverser systems.

In various embodiments, a thrust reverser system may comprise a duct and a valve. The duct may define a flow channel. The duct may also comprise a first end and a second end. The valve may be operatively coupled to the first end of the duct. The valve may also he capable of conducting a high pressure fluid flow from an engine (e.g., a gas turbine aircraft engine). The second end of the duct may be in fluid communication with a fan air duct. In various embodiments, a portion of the duct may have a tapered profile. In various embodiments, the duct may comprise a baffle, a blocker nozzle, and/or the like. In this way, a portion of the duct (e.g., the second end), may he shaped to direct a flow of air in a predetermined direction.

In various embodiments, an aircraft nacelle may house a gas turbine, a blocker nozzle, a valve, and a fan air duct. The gas turbine may comprise a high pressure output. The blocker nozzle may comprise an inlet and an outlet. The valve may operatively couple the inlet of the blocker nozzle to the high pressure output of the gas turbine. The fan air duct may couple to the outlet of the blocker nozzle. In various embodiments, the blocker nozzle may define a channel. Moreover, in various embodiments a portion of the blocker nozzle may be tubular and/or cylindrical, For example, the blocker nozzle may comprise a body portion and a nozzle portion. In various embodiments, the valve may he configured to conduct a high pressure air flow from the high pressure output to the inlet in response to predetermined conditions.

In various embodiments, a method for creating reverse thrust in an aircraft may be provided. The method may be performed in a nacelle comprising a blocker nozzle configured to conduct a high pressure airflow in a fan air duct. In response to a predetermined condition, a thrust reverser system may activate a high pressure airflow through the blocker nozzle. The predetermined condition may be, for example, an aircraft landing or deceleration event. The high pressure airflow may create a virtual blocker door with a wall of air. In response to creating a wall of air, airflow through the fan air duct may be redirected to a cascade array to create thrust reverse. In various embodiments, the high pressure airflow creates a wall of air may be provided from a high pressure stage of a gas turbine.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1A:
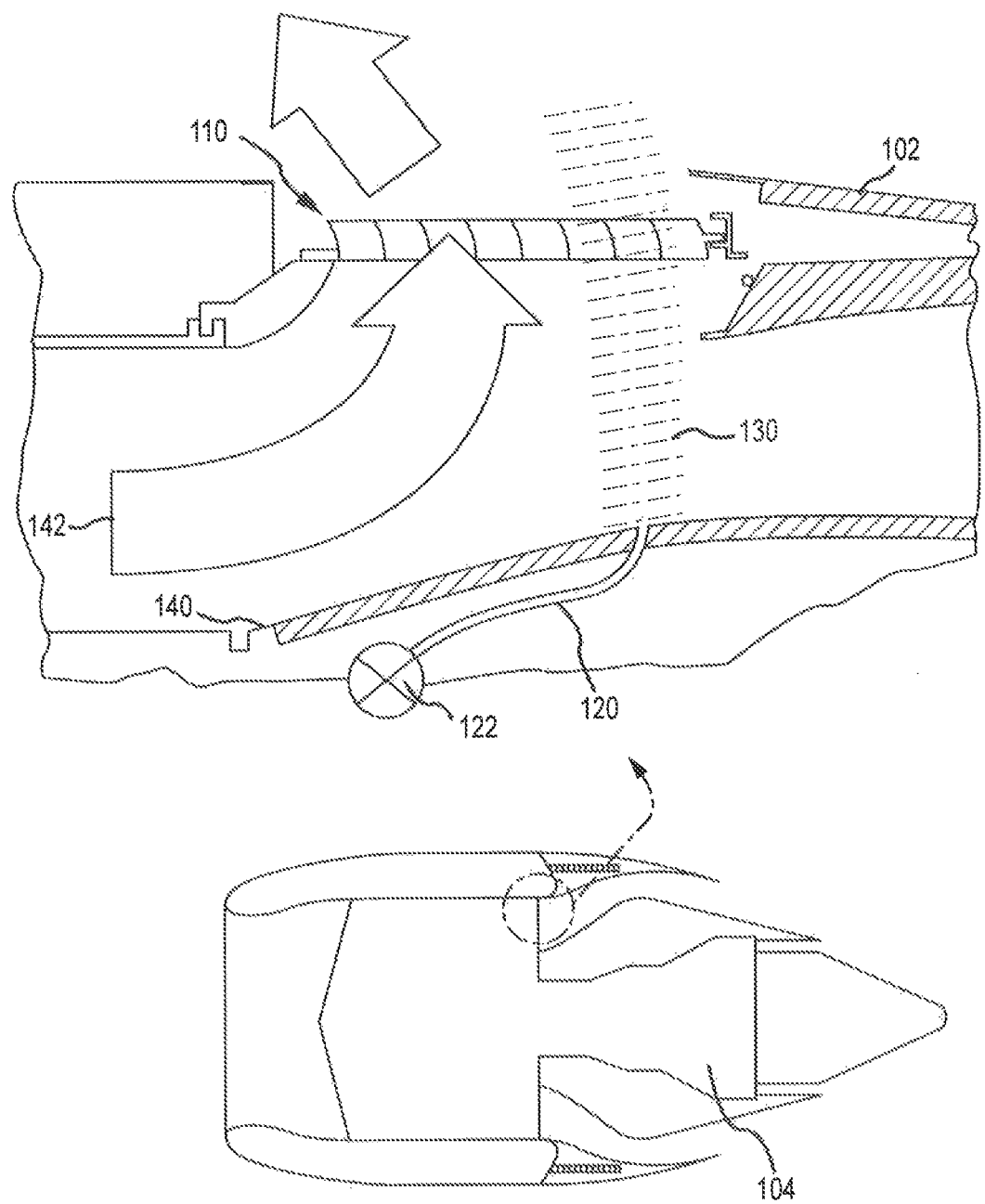
FIG. 1A illustrates a cross-sectional view of an aircraft nacelle, in accordance with various embodiments.

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, "aft" refers to the direction associated with the tail (e.g., the hack end) of an aircraft, or generally, to the direction of exhaust of the gas turbine. As used herein, "forward" refers to the directed associated with the nose (e.g., the front end) of an aircraft, or generally, to the direction of flight.

In various embodiments, a virtual blocker door system, apparatus and method (collectively, the "virtual blocker door") increase the aerodynamic efficiency of the fan duct. The virtual blocker door can create a jet or stream of pressurized air that inhibits the airflow of air through the fan air duct. In other words, the jet or stream of pressurized air creates a "wall of air" that redirects air flowing through the fan air duct. In this way, the "wall of air" prevents some portion of the air flow through the fan air duct from exhausting aft from the fan air duct, instead, the wall of air directs flow through the fan air duct to a cascade array that is configured to redirect the air to create a desired reverse thrust.

The virtual blocker door can create the wail of air by bleeding high pressure air from the gas turbine engine of the aircraft. For example, the virtual blocker door may be air at a sufficiently high pressure and low temperature to redirect the fan air flow. The virtual blocker door may comprise a valve and a duct. The valve may allow air from the gas turbine into the duct when the thrust reverser is activated (e.g., in response to an aircraft landing). The duct can conduct the air to the fan air duct to create the wall of air.

The aerodynamic efficiency of the fan air duct is improved over conventional systems because the wall of air allows the air framer or nacelle manufacturer to remove components in the fan air duct that create aerodynamic inefficiency (e.g., drag links, drag link attachment fittings, and doors). In this way, using the virtual blocker door provides a generally more aerodynamic fan air duct.

Figure 1B:
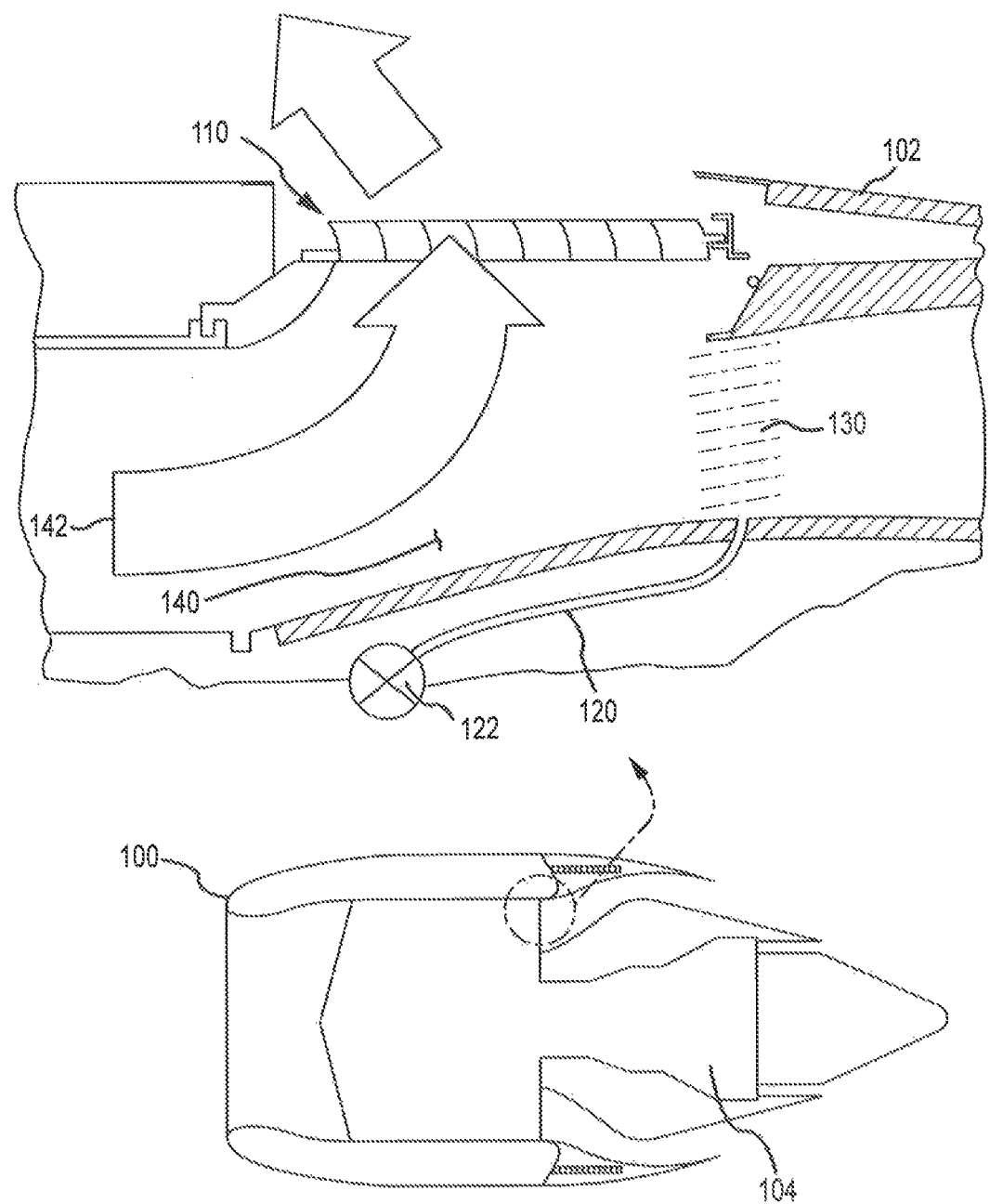
FIG. 1B illustrates a cross-sectional view of an aircraft nacelle, in accordance with various embodiments.
Figure 1C:
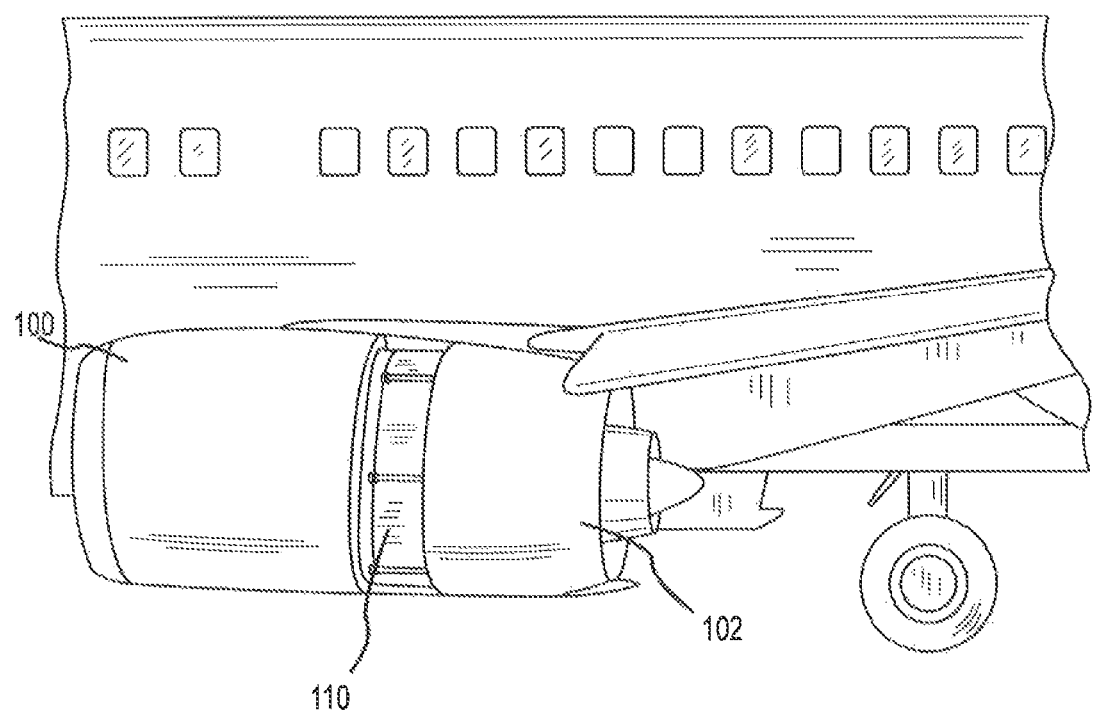
FIG. 1C illustrates a side view of an aircraft engine installed on an aircraft, in accordance with various embodiments.

In various embodiments and with reference to FIGS. 1A and 1B, the virtual blocker door comprises a duct 120 and a valve 122. Valve 122 may couple to or he in fluid communication with a first end of duct 120. A second end of duct 120 may couple to a fan duct 140 in an aircraft nacelle 100. Valve 122 may be operatively connected to or in fluid communication with a bleed air port of an engine 104. In response to a predetermined condition (e.g., a landing event), a translating sleeve 102 may move in the aft direction to expose a cascade 110. With momentary reference to FIG. 1C, cascade array 110 may be a portion of the outer diameter of nacelle 100. With reference again to FIG. 1A, in response to the thrust reverser system being activated, valve 122 may open to allow high pressure air to flow through duct 120 creating a wall of air 130. Wall of air 130 may inhibit flow through fan duct 140. For example, wall of air 130 may be directed to and/or through cascade 110, as shown in FIG. 1A. Wall of air 130 may also be directed to and/or at translating sleeve 102, as shown in FIG. 1B. Moreover, wall of air 130 may direct or divert a fan air flow 142 through cascade 110. Fan air flow 142 may be diverted or directed at any suitable angle to, for example, create a reverse thrust (e.g., a thrust in the forward direction to, for example, slow down an aircraft).

More specifically, in operation (e.g., when the thrust reverser is activated), wall of air 130 may block fan air flow 142. For example, wall of air 130 may have a higher pressure causing fan air flow 142 to be diverted along a path of lower pressure (e.g., through cascade 110). Wall of air 130 may also be shaped so that a portion of fan air flow 142 is directed radially away or radially outward from a centerline of the nacelle (e.g., in a direction generally perpendicular to a central axis of the engine or in a direction generally normal to the cascade). As such, fan air flow 142 may be directed by wall of air 130 and/or cascade 110 to create the desired reverse thrust. Cascade 110 may be further configured to manipulate the direction of fan air flow 142 in any suitable direction to create suitable reverse thrust.

More specifically, the fan duct air flow may be turned, stopped, reduced or otherwise directed, in this regard, the mass flow of the virtual blocker door system is to be sized to adequately perform this function.

In various embodiments, duct 120 may be any suitable structure configured to conduct a fluid. Duct 120 may comprise a body portion having a generally tubular and/or cylindrical shape. Duct 120 may also comprise a flow directing or nozzle portion. The body portion and the nozzle portion may be a single piece or coupled together as an assembly. Duct 120 may define a flow channel or flow path (e.g., a cavity defined by the outer surface of the duct that is suitable for conducting a fluid). Duct 120 may be a single piece construction or an assembly. Duct 120 may be any suitable shape or size.

In various embodiments, a portion of duct 120 may have a generally circular or tubular profile. A portion of duct 120 may have a tapered or non-uniform profile. In various embodiments, duct 120 may comprise one or more flow directing device such as, for example, a nozzle (nozzle 221 as shown in FIG. 2C), a baffle or manifold (baffle 222 as shown in FIG. 2D) or other suitable structure to distribute flow along a portion of the circumference of nacelle 100 corresponding to exposed cascade 110 and/or translating sleeve 102/202, as shown in FIGS. 1A and 2B. Moreover, the flow directing device may comprise one or more baffles 222 that conduct high pressure air from engine 204 to create wall of air 230, as shown in FIG. 2B.

Figure 2A:
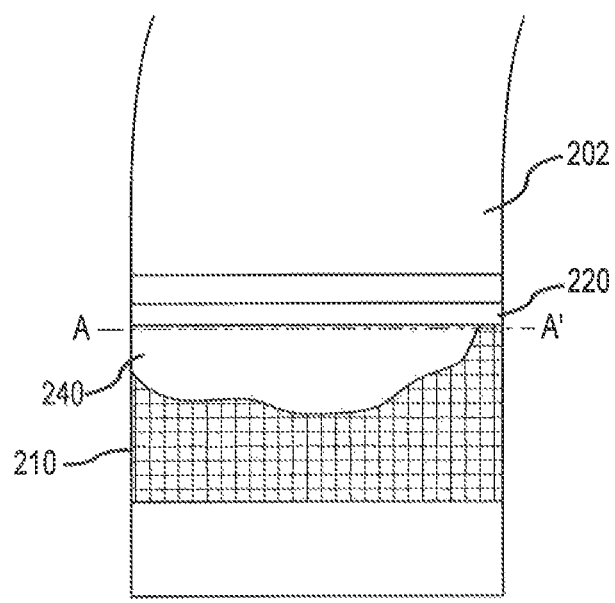
FIG. 2A illustrates a top view of a portion of a nacelle with an exposed cascade, in accordance with various embodiments.
Figure 2B:
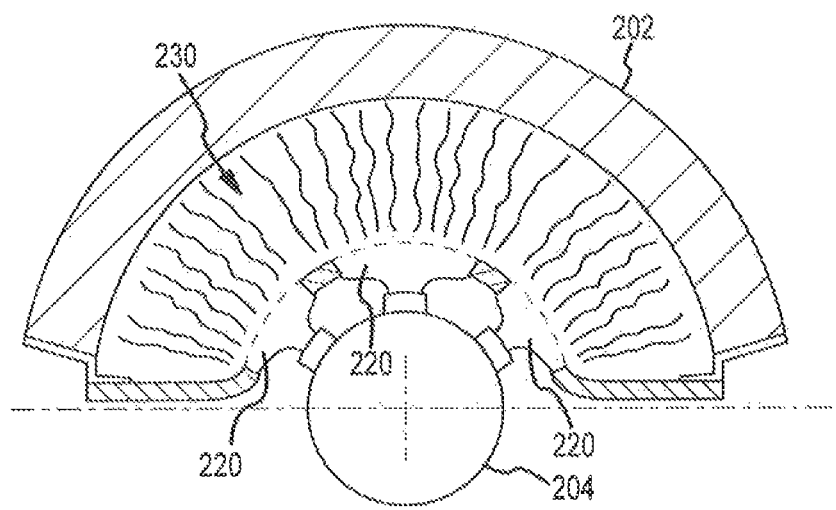
FIG. 2B illustrates a cross-section view of a flow directing device installed on an engine, in accordance with various embodiments.
Figure 2D:
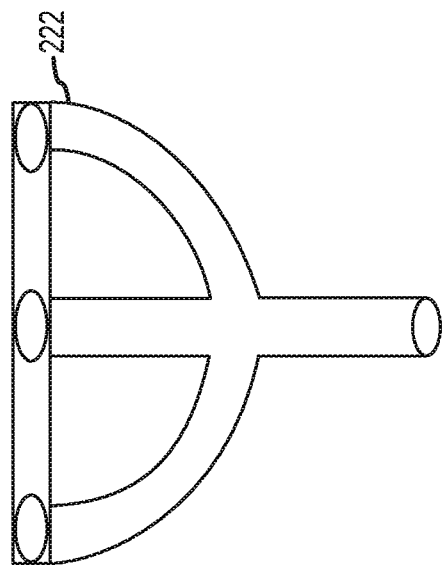
FIG. 2D illustrates a side view of a flow directing device, in accordance with various embodiments.
Figure 2C:
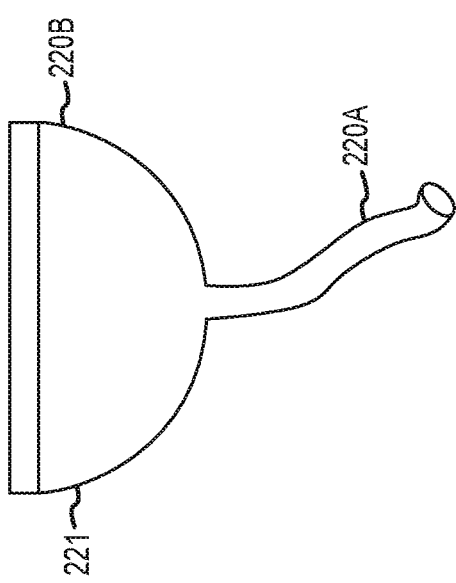
FIG. 2C illustrates a side view of a flow directing device, in accordance with various embodiments.

In a first example and with reference to FIGS. 2A, 2B, and 2C, a portion of the duct may include a flow directing device 220. Flow directing device 220 may be any suitable structure including, for example, a nozzle, as shown in FIG. 2C. More specifically, duct 120 may comprise a generally tubular portion 220A and a fan portion 220B. Fan portion 220B may have a width corresponding to the width of cascade array 110 (e.g., the entire width associated with axis A-A'). Blocker nozzle 221 may distribute the air across the width. In this way, blocker nozzle 221 creates a wall of air that inhibits the flow of air through fan duct 240 and directs fan air flow through cascade 210.

In a second example and with reference to FIGS. 2A and 2D, a portion of the duct may include a flow directing device 220. in various embodiments, flow directing device 220 may be a baffle system 220 capable of receiving high pressure air from the duct and distributing the flow along the width of the cascade array (e.g., the portion of the cascade associated with axis A-A'). Baffle system 220 may comprise one or more distribution channels and exhaust channel. In this manner, the wall of air (e.g., wall of air 130 as shown in FIG. 1A) is distributed along the entire width of the cascade array (e.g., the entire width associated with axis A-A).

In various embodiments, the flow directing device 220 may be configured with flow directing elements. For example, flow directing device 220 may be shaped or angled, such that air exhausted through flow directing device 220 is directed away from a centerline of the nacelle at a determined angle. Shaped aerodynamic vanes may be used to help direct flow as may be needed. Moreover, the flow directing device may be moveable, such that the flow away from the nacelle changes over the duty cycle associated with thrust reverser operation. For example, flow directing device 220 may exhaust air at a first angle during initial slowdown of the aircraft to a predetermined speed to provide a first reverse thrust (e.g., stopping force). In response to reaching the predetermined speed, flow directing device 220 may adjust the angle of exhaust air to reduce the reverse thrust (e.g., to provide more or less stopping force).

In various embodiments, flow directing device 220 may also be capable of directing flow in predetermined zones. For example, flow directing device 220 may direct flow to avoid or reduce creating foreign objects and debris for the engine to ingest. Moreover, flow directing device 220 may be capable of directing flow away from aircraft structures to avoid or reduce stressing or heating aircraft structures.

In various embodiments and with reference again to FIG. 1A, valve 122 may be any suitable valve, now known or hereinafter devised, that is capable of conducting the necessary pressure and flow to create wall of air 130. For example, valve 122 may he a pressure regulating valve or a flow control valve. Cascade 110 may be suitable cascade, now known or hereinafter devised, that is capable of directing the flow created by wall of air 130 and fan air flow 142.

In various embodiments, the virtual blocker door systems, apparatus and methods described herein may be employed with any suitable nacelle, engine, and/or thrust reverser system.

Thus, in various embodiments, the virtual blocker door described herein improves the aerodynamic efficiency of a fan air duct.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to he limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will he apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of creating reverse thrust in an aircraft having a gas turbine, the gas turbine comprising a nacelle with a thrust reverser system, the thrust reverser system comprising a plurality of ducts, each duct defining a channel having an inlet and an outlet, each duct comprising a flow directing device, located at the outlet and having an opening positioned at an inner wall of a fan air duct, and a valve operatively coupling the inlet to a high pressure output of a gas turbine, the valve being configured to conduct a high pressure air flow from the high pressure output to the inlet in response to a predetermined condition, the nacelle further comprising a cascade array located radially outward from the fan air duct, wherein the plurality of ducts are circumferentially disposed along the fan air duct within a common axial plane, wherein each outlet of the plurality of ducts are coupled to the fan air duct, wherein each flow directing device is circumferentially discrete, and wherein each flow directing device is configured to distribute the high pressure air flow across a respective portion of a width of the cascade array, the method comprising:
   directing the high pressure airflows through the flow directing devices in response to a predetermined condition, wherein the flow directing devices are configured to conduct the high pressure airflows into the fan air duct to form a wall of air; and
   inhibiting the flow of bypass air in the fan air duct using the wall of air to direct the flow of bypass air radially outward, with respect to a centerline of the gas turbine, through the cascade array to create reverse thrust.

2. The method of claim 1, wherein the predetermined condition is an aircraft landing event.

3. A thrust reverser system, comprising:
   a plurality of ducts, wherein each duct defines a flow channel and comprises a first end and a second end and a valve operatively coupled to the first end; and
   a fan air duct configured to conduct a flow of bypass air in fluid communication with the second end;
   wherein each duct comprises a flow directing device located at the second end and having an opening positioned at an inner wall of the fan air duct, each duct configured to conduct a flow of pressurized air from a high pressure stage of a gas turbine and introduce the flow of pressurized air into the fan air duct, wherein a pressure of the flow of pressurized air is greater than a pressure of the flow of bypass air, the flow of pressurized air being configured to inhibit the flow of bypass air in the fan air duct;

wherein the plurality of ducts are circumferentially disposed along the fan air duct within a common axial plane, each flow directing device being circumferentially discrete; and wherein each flow directing device is configured to distribute the flow of pressurized air across a respective portion of a width of a cascade array located radially outward from the fan air duct.

4. The thrust reverser system of claim 3, wherein the valves are configured to initiate the flows of pressurized air through the flow channels.

5. The thrust reverser system of claim 3, wherein each flow directing device has a tapered profile.

6. The thrust reverser of claim 3, wherein each flow of pressurized air is directed radially outward from a centerline of the gas turbine and a portion of the flow of bypass air is directed radially outward from the centerline of the gas turbine.

7. An aircraft nacelle having a thrust reverser system, comprising:

a plurality of ducts, each duct defining a channel having an inlet and an outlet, each duct comprising a flow directing device, located at the outlet and having an opening positioned at an inner wall of a fan air duct, and a valve operatively coupling the inlet to a high pressure output of a gas turbine, the valve being configured to conduct a high pressure air flow from the high pressure output to the inlet in response to a predetermined condition;

a cascade array located radially outward from the fan air duct;

wherein the plurality of ducts are circumferentially disposed along the fan air duct within a common axial plane, each outlet of the plurality of ducts are coupled to the fan air duct, and each flow directing device is circumferentially discrete;

wherein each flow directing device is configured to distribute the high pressure air flow across a respective portion of a width of the cascade array; and wherein each flow directing device is configured to direct the high pressure air flow into the fan air duct to fluidically divert a flow of bypass air through the cascade array to create a reversal of thrust.

8. The thrust reverser system of claim 5, wherein each flow directing device comprises a baffle having a plurality of tubes through which the flow of pressurized air is distributed, the plurality of tubes being connected to a single tube through which the flow of pressurized air is supplied.

9. The thrust reverser system of claim 5, wherein each flow directing device is substantially coaxial to an aft portion of the cascade array.

10. The aircraft nacelle of claim 7, wherein each flow directing device further comprises a body portion, the body portion having a generally tapered profile.

11. The aircraft nacelle of claim 7, wherein the high pressure air flows create a wall of air in the fan air duct, the wall of air having a first pressure.

12. The aircraft nacelle of claim 11, wherein the flow of bypass air has a second pressure, the first pressure being greater than the second pressure.

13. The aircraft nacelle of claim 12, wherein the wall of air is directed towards an aft portion of the cascade array.

14. The aircraft nacelle of claim 13, wherein the wall of air is at least partially bounded by a forward portion of a translating sleeve when the translating sleeve is deployed, the forward portion of the translating sleeve being located aft of the cascade array.

* * * * *